United States Patent [19]

Martin et al.

[11] Patent Number: 4,563,791
[45] Date of Patent: Jan. 14, 1986

[54] WING CUTTER APPARATUS

[75] Inventors: Eugene G. Martin, New Holland; Harold C. Martin, Lancaster, both of Pa.

[73] Assignee: Favorite Manufacturing, Inc., New Holland, Pa.

[21] Appl. No.: 572,205

[22] Filed: Jan. 18, 1984

[51] Int. Cl.$^4$ .............................................. A22C 21/00
[52] U.S. Cl. ........................................................ 17/11
[58] Field of Search ....................................... 17/11, 52

[56] References Cited

U.S. PATENT DOCUMENTS

4,016,624 4/1977 Martin et al. ............................ 17/52
4,385,421 5/1983 Martin ...................................... 17/52

Primary Examiner—Francis S. Husar
Assistant Examiner—Robert Showalter
Attorney, Agent, or Firm—Price, Heneveld, Huizenga & Cooper

[57] ABSTRACT

An apparatus for severing portions of the wings of a poultry carcass includes an elongated conveyor having a plurality of spaced carcass supports thereon for sequentially moving a poultry carcass through first and second cut-off stations. Spaced guide rails or bars extend along an upper run of the conveyor to engage the wings and guide them through the stations. The first cut-off station includes rotating knives which sever the wing tips. The second station includes a pair of pivotally mounted or swinging blades which sever the intermediate portions of the wings from the wing stubs. A wing positioning and holding assembly positions and holds the wing in position for cutting at the second station. A cam assembly moves at least a portion of the wing positioner from an operative position to an inoperative position to permit the carcass to move out of the second station.

25 Claims, 18 Drawing Figures

WING CUTTER APPARATUS

BACKGROUND OF THE INVENTION

The present invention relates to cut-up machines and more particularly to a unique poultry wing cutter or splitter machine.

Various machines have been developed for automatically cutting up an eviscerated poultry carcass into its various component parts. These machines have become more prevalent as a result of the expansion of the fast-food restaurant business. The machines have replaced manual cut-up operations in many processing lines due to their labor savings, increased yield and/or increased rates of production.

Cut-up machines have been manufactured which cut up the whole poultry carcass into its normal commercial pieces on an automatic and sequential basis. An example of one such machine may be found in U.S. Pat. No. 4,016,624 entitled POULTRY CUT-UP MACHINE and issued on Apr. 12, 1977 to Eugene Martin and Harold Martin. The machine shown in this patent includes a conveyor for sequentially moving a poultry carcass through a plurality of cut-up stations. The machine automatically removes the wing tips, the intermediate sections from the wing stubs, the wing stubs from the back, the whole breast from the vertebrae and the thighs and legs from the vertebrae.

In many operations, the poultry carcass is separated or broken into a front half or saddle and a rear half or saddle. The front saddle includes the breast, a portion of the back and the wings. The rear half or saddle includes a back portion, the thighs and legs. The rear saddle may be transferred to a poultry leg and processing machine which separates the legs and thighs from the back. An example of one such machine may be found in U.S. Pat. No. 4,385,421 entitled POULTRY LEG/BACK PROCESSOR and issued on May 31, 1983 to Eugene Martin.

In a typical operation, the front saddle, including the breast, a portion of the back vertebrae and the wings, would be fed into a breast processor of the type illustrated in U.S. patent application Ser. No. 06/364,604 entitled AUTOMATIC POULTRY BREAST PROCESSING MACHINE AND METHOD, filed on Apr. 1, 1982 in the name of Eugene G. Martin and now U.S. Pat. No. 4,424,608. The machine of such application includes an indexed, stepped or sequential conveyor. The conveyor supports a plurality of spaced, tandemly arranged transport spikes or carcass supports. The poultry carcass sections are supported on the spikes. Elongated guide rods extend along the conveyor to engage the wing portions. The breast processing machine severs the wings and splits the breast longitudinally.

A need exists for an improved wing cutting or severing machine which is readily added to an existing processing machine, such as a breast processor, to perform initial wing cutting and thereby increase production rates, yields and/or accuracy of the cut-up operations.

SUMMARY OF THE INVENTION

In accordance with the present invention, a unique wing cutter or splitter is provided which is readily added to existing cut-up machines to remove portions of the wings of a poultry carcass. Essentially, the apparatus includes a support for positioning a poultry carcass at a cutting station. The cutting station includes a movable knife blade which engages the wing portion at a joint and severs the wing portion. Provision is made for locking or positioning the wing and holding the wing at the knuckle for the cutting step.

In the preferred form, the wing is positioned by a wing lock or positioner which is movable into and out of an operative position. A biased wing holder holds the wing against the positioner during the cutting step. The poultry support includes an elongated conveyor defining an upper run. The conveyor supports a plurality of spaced, tandemly arranged carcass support members or spikes. Elongated, spaced, paired guide bars extend along the upper run of the conveyor. The wings pass through the guide bars which position the wings at the cutting station.

In the preferred embodiment, the tips or outermost portions of the wings are initially cut or severed from the carcass at a first cutting station. The conveyor then transports the carcass to a second cutting station at which it is engaged by a wing positioner and holding means and the intermediate portion of the wing is severed from a wing stub.

The apparatus in accordance with the present invention is readily added to a breast processing unit for subsequent removal of the wing stubs and segmenting of the breast into longitudinal halves. The wing positioning and holding means at the second cutting station engages the wing and positions the knuckle for accurate cutting by the knife blade. The apparatus in accordance with the present invention insures more accurate severing or segmentation of the wing into its component parts.

BRIEF DESCRIPTION OF THE DRAWINGS

FIG. 11a is a schematic, side elevational view of another wing positioning or lock subassembly;

FIG. 12a is a schematic, end elevational view of the subassembly of FIG. 11a;

DETAILED DESCRIPTION OF THE PREFERRED EMBODIMENT

Figure 1:
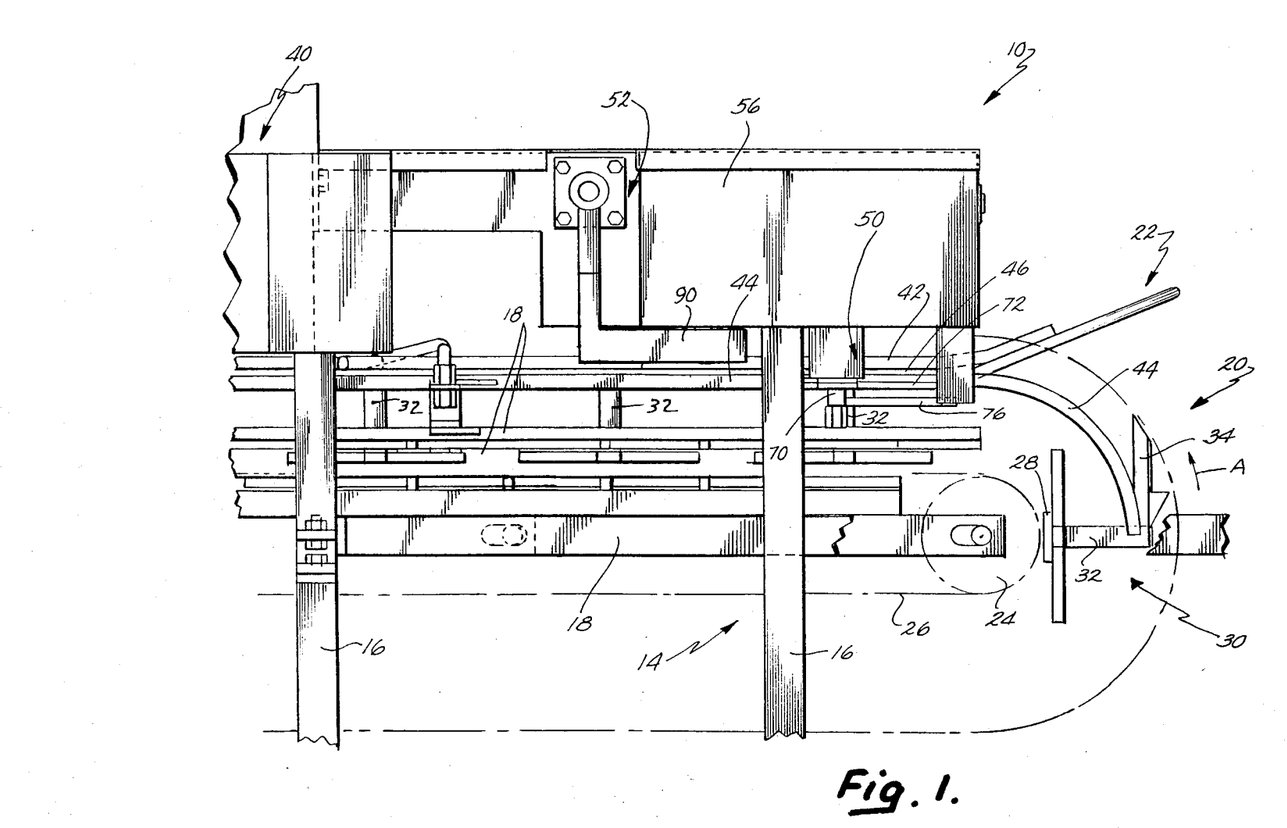
FIG. 1 is a fragmentary, side elevational view showing the general layout of a wing cutter in accordance with the present invention.

A preferred embodiment of a wing cutter, splitter or poultry cut-up machine in accordance with the present invention is schematically illustrated in FIG. 1 and generally designated 10. Apparatus 10 includes a main frame 14 having vertical members 16 and horizontal members 18. Frame 14 supports an elongated, endless-type conveyor schematically illustrated and generally designated by the numeral 20. Conveyor 20 is of the type illustrated in U.S. patent application Ser. No. 06/364,604 entitled AUTOMATIC POULTRY BREAST PROCESSING MACHINE AND METHOD, filed on Apr. 1, 1982 in the name of Eugene G. Martin and now U.S. Pat. No. 4,424,608, issued on Jan. 10, 1984, the disclosure of which is hereby incorporated by reference.

Figure 2:
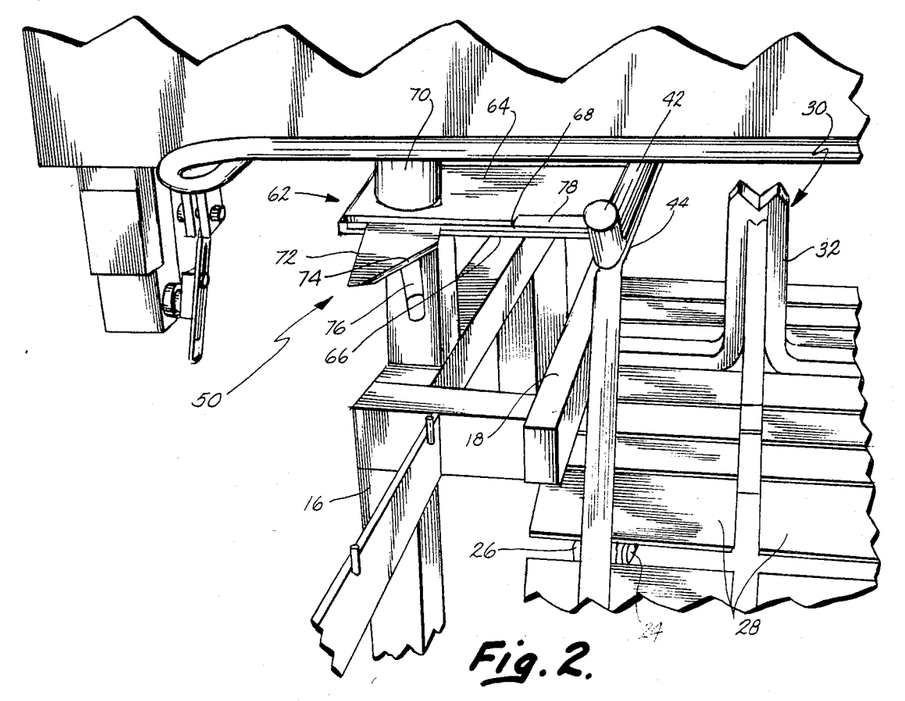
FIG. 2 is a fragmentary, perspective view of a portion of the machine showing the conveyor and first knife station along the left-hand side of the machine.
Figure 3:
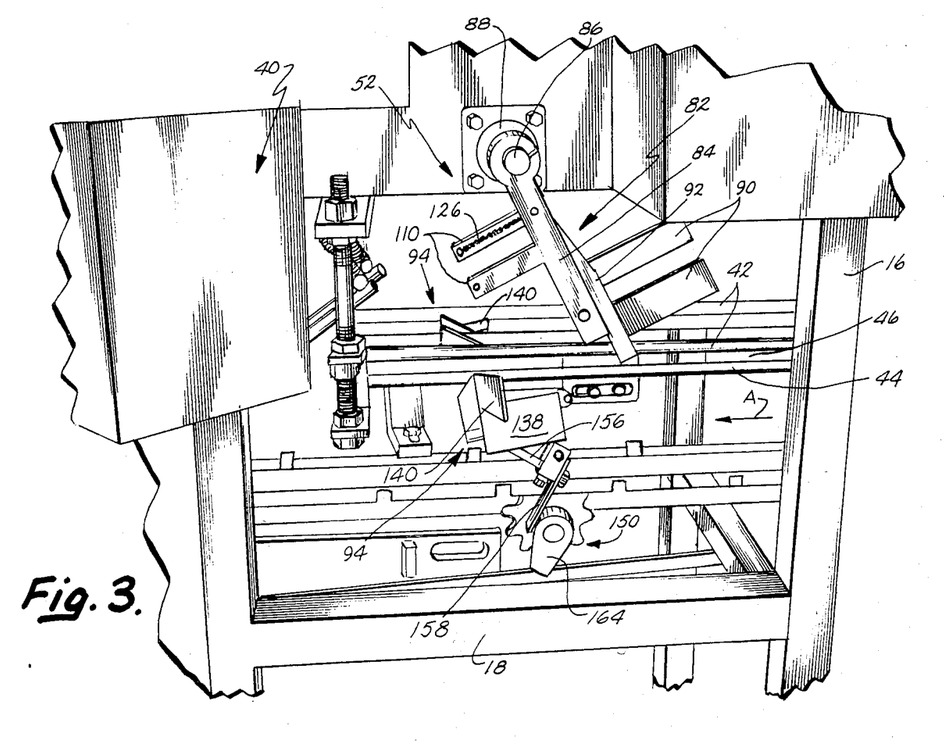
FIG. 3 is a fragmentary, side elevational view of the left side of the machine showing the second cutting station.
Figure 4:
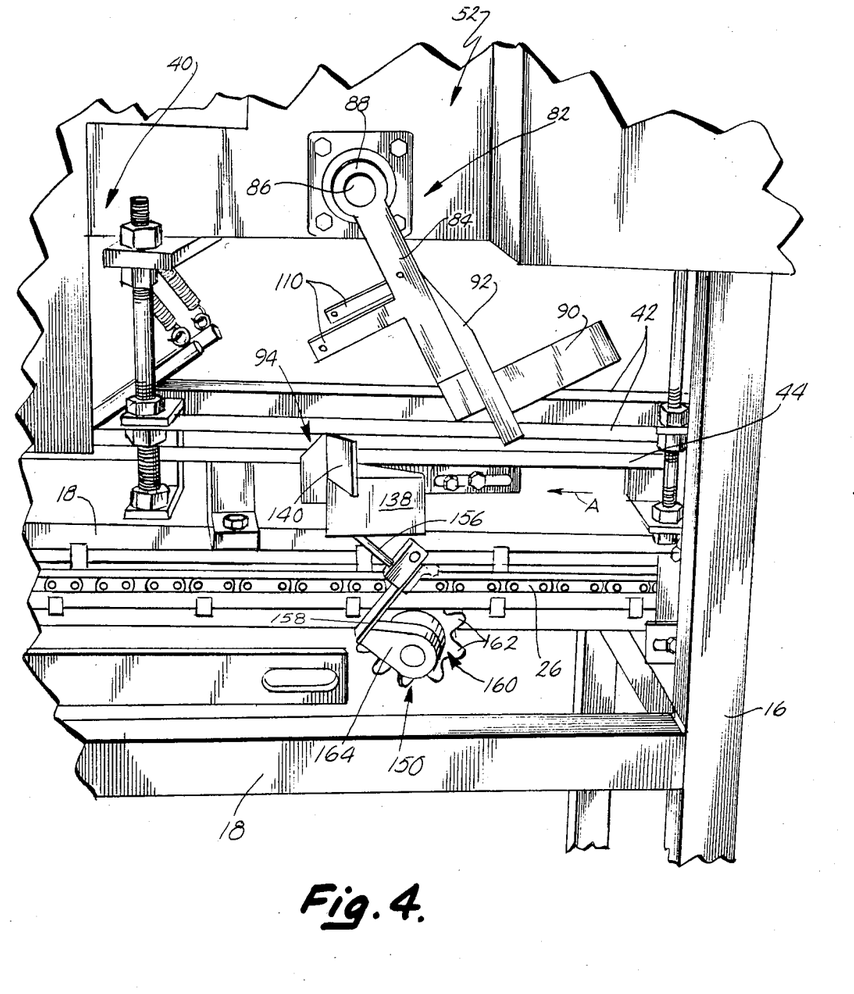
FIG. 4 is a fragmentary, perspective view along the left side of the machine showing a wing positioning means in the operative position.

Conveyor 20, as schematically shown in FIG. 1 and as also seen in FIGS. 2–4, defines an infeed end 22. The conveyor includes opposed, spaced sprockets 24 about which endless chains 26 extend. Extending between chains 26 are slats 28. Secured to the slats are a plurality of tandemly arranged, spaced, carcass support members 30. Each carcass support member 30 includes a post 32 and an elongated spike 34. Poultry carcasses are manually lowered on support members 30 at the infeed end 22 of the conveyor. The conveyor is driven in a conventional fashion to sequentially move the support members 30 in a stepped fashion through the apparatus 10. Apparatus 10 is bolted to a breast processor 40, only a portion of which is shown in FIG. 1. Breast processor 40 is of the type illustrated in the aforementioned U.S. patent application, Ser. No. 06/364,604. Conveyor 20 is merely an extension of the conveyor of the processor 40. The conveyor moves the carcass through the breast processor 40 for the final cut-up operations.

Apparatus 10 further includes elongated, vertically spaced guide rails 42, 44. A pair of such guide rails 42, 44 extend longitudinally of conveyor 20 along the lateral sides thereof. As explained in more detail in the aforementioned patent application, the poultry carcass is moved by the conveyor so that the wing sections of the carcass ride within the gap or slot 46 defined by the guide rods 42, 44. Rods 42, 44 exert a retarding force on the wings and position the wings as they pass through apparatus 10.

Apparatus 10 further includes a pair of cutting stations including a first or front cut-off knife assembly generally designated 50 and a second cut-off knife assembly generally designated 52. Only a portion of cut-off assembly 52 is illustrated in FIG. 1. Cut-off knife assembly 50 operates to sever the wing tips from the whole wings of the poultry carcass. Cut-off knife assembly 52 functions to sever the intermediate wing portions from the wing stubs of the whole wings.

Supported on frame 14 above the upper run of the conveyor is a drive housing 56. Within drive housing 56 is a drive which is operably connected to both cut-off knife assemblies 50, 52, as described in more detail below. Conventional controls are also provided for the sequential step operation of conveyor 20 and timed actuation of each cut-off knife assembly 50, 52.

FRONT CUT-OFF KNIFE ASSEMBLY

Front cut-off knife assembly 50 is illustrated in FIGS. 1 and 2. Apparatus 10 includes two such cut-off knife assemblies, namely, a right-hand and a left-hand assembly positioned on each side of the conveyor. Cut-off assemblies 50 operate to sever the wing tips of the wings on both sides of the carcass. As seen in FIGS. 1 and 2, each cut-off assembly 50 includes a guard 62 defined by a pair of plates 64, 66. The plates extend outwardly perpendicular to upper guard bar or rail 42. Plates 64, 66 define a slot 68. A vertical shaft 70 extends through suitable apertures in the free ends of plates 64, 66. Secured to a lower end of the shaft is a knife blade 72 having a cutting edge 74. Positioned below knife blade 72 and also secured to shaft 70 is a positioning arm or bar 76. Shaft 70 extends upwardly into housing 56 where it is operatively connected with the drive means, as discussed in more detail below. As seen in FIG. 2, upper plate 64 defines a beveled ramp portion 78 immediately adjacent guide bar 42. The first station or front cut-off knife assemblies 50 of apparatus 10 are illustrated in more detail in previously mentioned U.S. Pat. No. 4,016,624. The disclosure of such patent, to the extent necessary, is hereby incorporated by reference.

As the poultry carcass moves to station 50, the conveyor will stop with the wings resting on upper plate 64. The wing tip will hang down across slot 68. The knife drive means is actuated rotating shaft 70 so that arm 76 and blade 74 move towards slot 68. Arm 76 leads knife 72 and engages the lowermost portion of the wing tip to force the wing tip against the slot 68. Blade 72 then cuts through the wing tip and enters slot 68 to sever the tip from the wing.

SECOND CUT-OFF KNIFE ASSEMBLY

The second cut-off knife assembly is illustrated in FIGS. 3 and 4. Assembly 52 includes a rotating or swinging knife 82 having a knife support arm 84 nonrotatably secured to a rotating drive shaft 86 at an upper end 88. Extending outwardly from support arm 84 is a knife blade 90. The direction of movement of the conveyor in FIG. 4 is designated by the arrow A.

A wing holding arm or wing tucker 92 is pivoted to support arm 84. A wing positioner or lock subassembly 94 is mounted on frame 14 beneath blade support 84. Wing positioner 94 is movable between an operative position, illustrated in FIG. 4, and an inoperative or lowered position, illustrated in FIG. 3.

Figures 5, 6, 7:
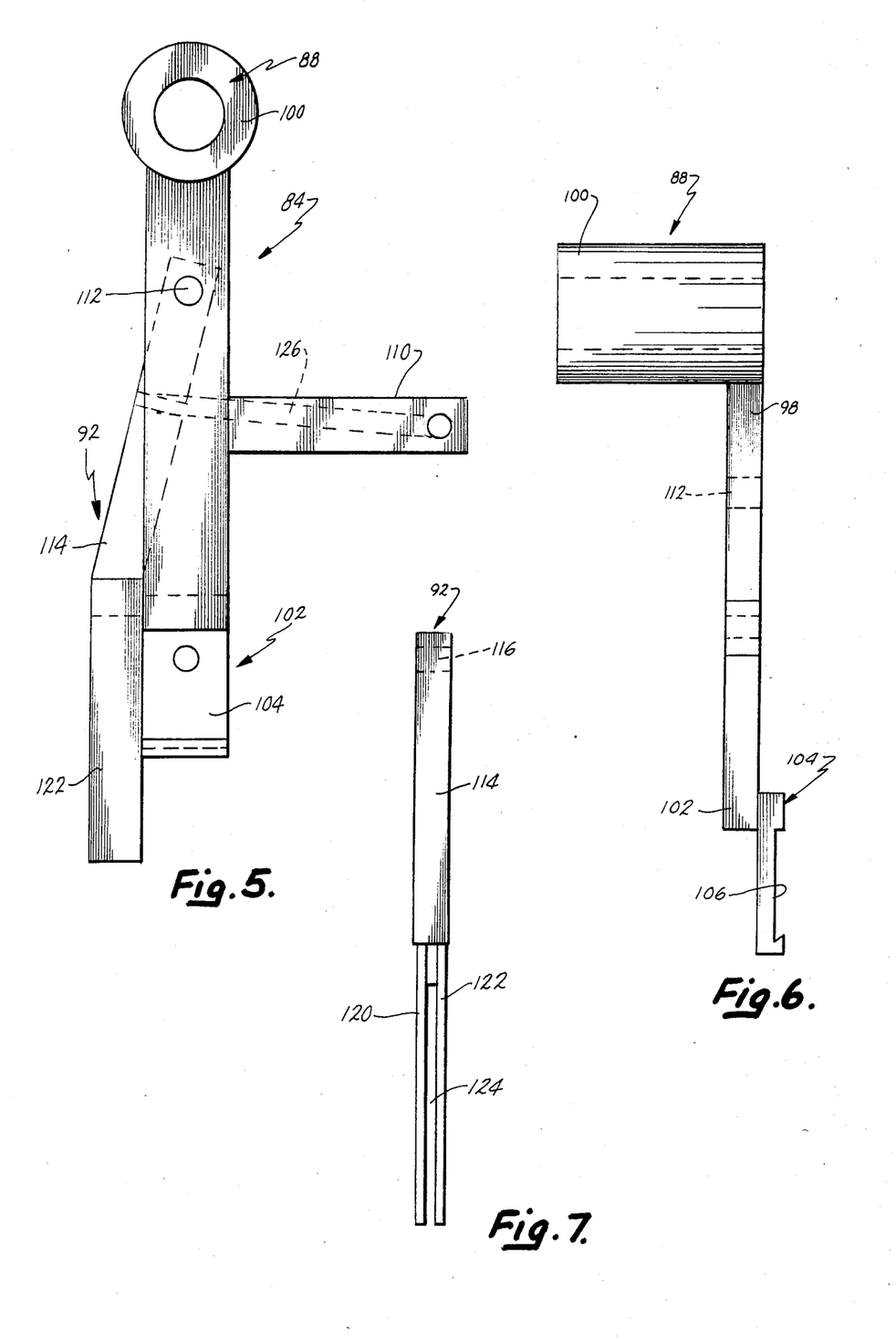
FIG. 5 is a side, elevational view of the knife support arm and wing holder subassembly.
FIG. 6 is an end, elevational view of the knife support arm.
FIG. 7 is an end, elevational view of the wing holding arm.

As seen in FIGS. 5 and 6, knife support arm 84 includes an elongated plate 98 having a hub 100 joined at the upper end thereof. Hub 100 is fixed to horizontally positioned shaft 86. A lower end 102 of plate 98 has a knife holder 104 welded or otherwise suitably formed therewith. Holder 104 defines a slot 106 within which blade 90 is held by a suitable fastener. Extending from plate 98 is a spring bracket 110. Plate 98 also defines a pivot aperture 112 for wing tucker 92.

As seen in FIGS. 5 and 7, wing tucker or arm 92 includes an upper plate-like portion 114 defining a pivot aperture 116. Arm 92 is pivoted to an inside surface of plate 98 by a suitable pin passing through apertures 116, 112. The lower end of tucker 92 is bifurcated to include opposed arms or plates 120, 122 which define a slot 124. When tucker 92 is pivoted to support plate 98, blade 90 extends through slot 124. A spring 126, schematically shown in FIG. 5, extends from spring bracket 110 to tucker arm 92. Sring 126 biases wing holder arm or tucker 92 towards support 98.

Figures 8, 9, 10:
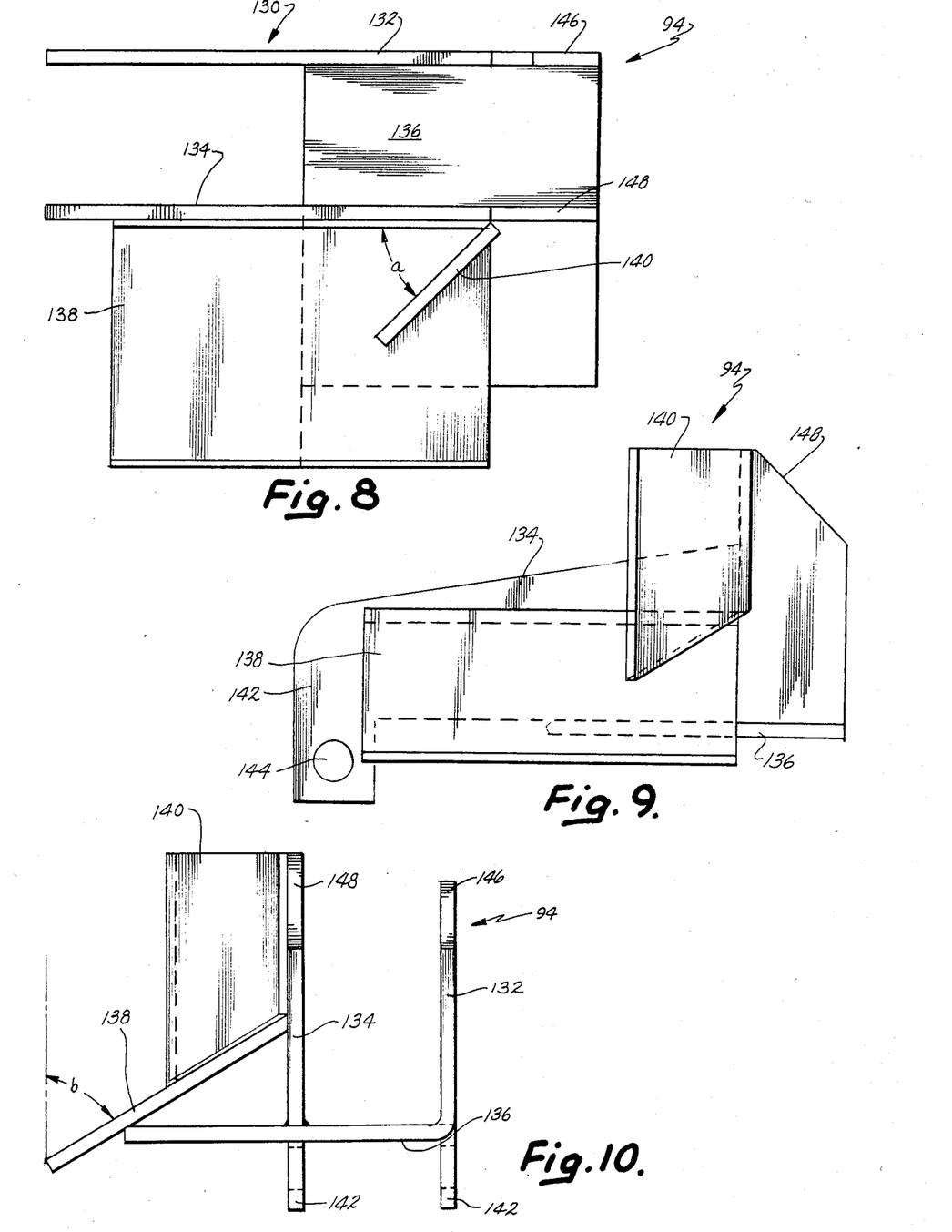
FIG. 8 is a side, elevational view of the wing lock or wing positioning member.
FIG. 9 is a top, plan view of the wing positioning member.
FIG. 10 is an end, elevational view of the left-hand wing positioning member.

Wing positioning subassembly 94 is best seen in FIGS. 8, 9 and 10. As shown therein, subassembly 94 includes a channel-shaped member 130 having opposed sidewalls 132, 134 joined to a base 136. Joined to the outer surface of sidewall 134 is a depending, angled wing plate 138. Plate 138 is angled downwardly at an acute angle with respect to a horizontal plane. Also joined to side 134 is an angled tab 140. As seen in FIGS. 3, 4 and 9, tab 140 extends vertically from wing plate 138 at an acute angle "a" which opens towards the infeed 22 of the conveyor. Plate 134 defines a depending tab or tang 142 which has a pivot aperture 144 formed therein. As seen in FIG. 10, wing plate 138 extends towards side 134 at an angle "b" from vertical. In the form illustrated, angle "a" is equal to 45°, and angle "b" is equal to 60°. As seen in FIG. 8, side plates 132, 134 slope upwardly towards end tabs or stops 146, 148, respectively.

Figure 11:
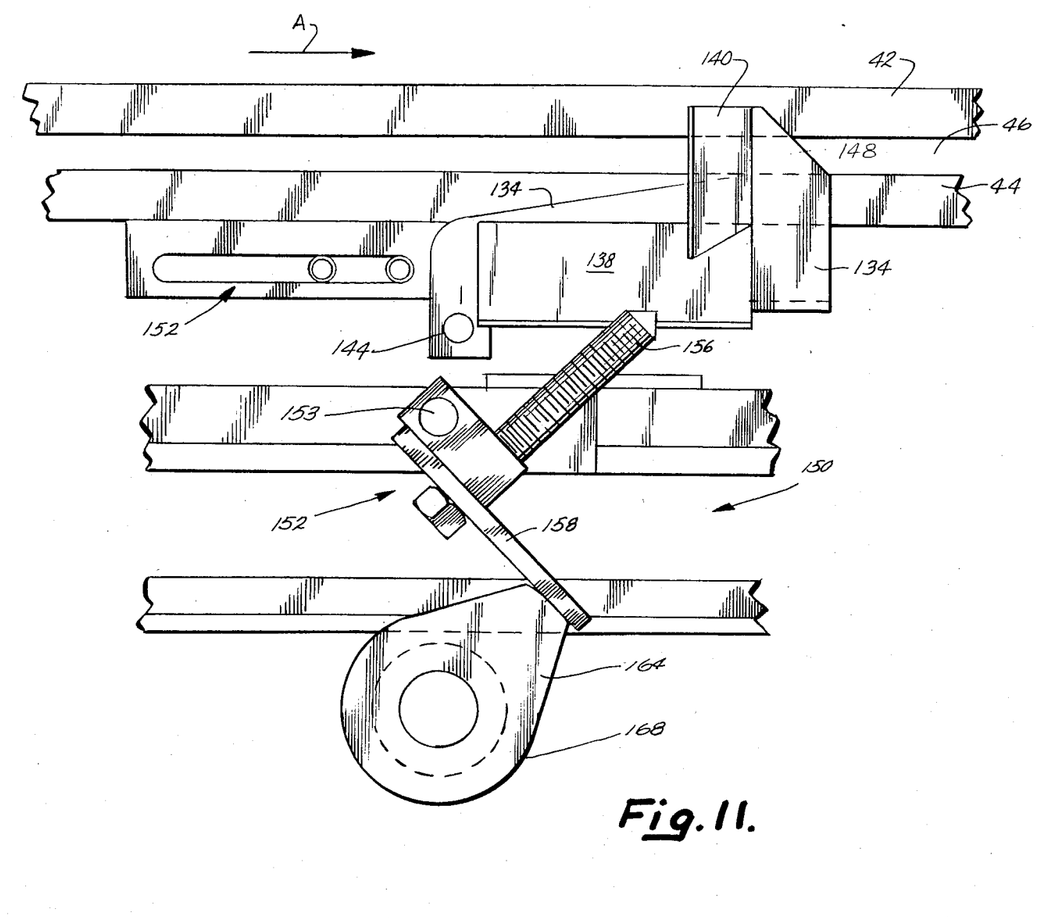
FIG. 11 is a schematic, side elevational view showing the wing positioning member and the means for moving the positioner between an operative and inoperative position.
Figure 12:
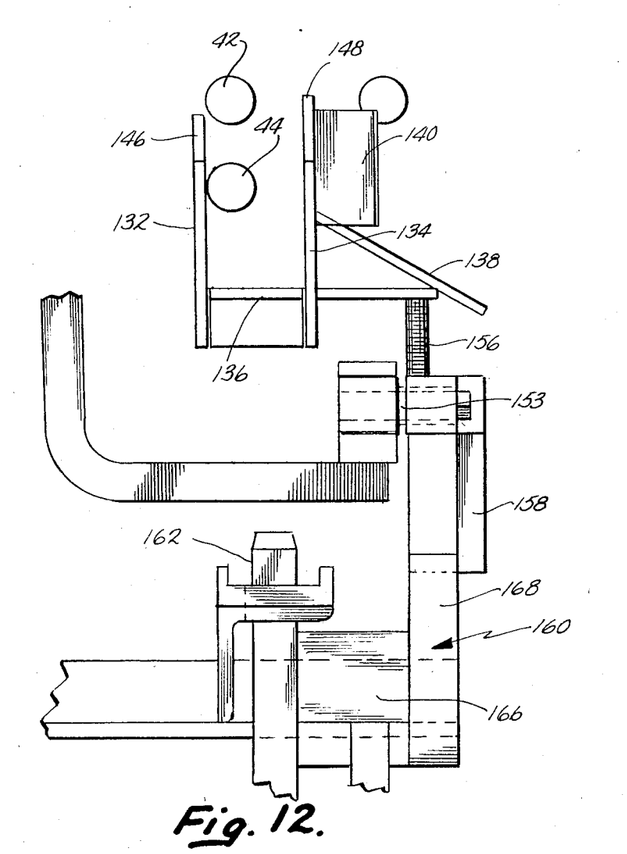
FIG. 12 is an end, elevational view of the subassembly of FIG. 11.

As shown in FIGS. 11 and 12, wing positioner or lock 94 is pivoted to a frame member 18 by an adjustable bracket 152. When in the operative position, guide rods or bars 42, 44 extend through the channel defined by side plates 132, 134. The rods are immediately adjacent side plate 132. As the carcass is moved into the second station, the wing positioned between bars 42, 44 will engage the forward portions of tabs or stops 146, 148 and the angled tab 140. The knuckle between the wing intermediate portion and the wing stub is held in position by the wing positioning side plates 132, 134, wing plate 138, tab 140, stops 146, 148 and rods 42, 44.

The spring-loaded wing holder arm or wing tucker 92, as will be apparent from FIG. 4, will contact the wing when it is held in this position. The arm holds the wing against the wing positioning means and tends to open the wing for proper cutting. As blade 90 swings or rotates, holding arm 92 will stay in essentially vertical position engaging the wing. Blade 90 will then pass down through the knuckle and sever the intermediate portion from the wing stub. The wing will be severed immediately adjacent bars 42, 44 within the slot defined by the channel portion of the wing positioner.

Provision is made for shifting the wing positioner 94 down and away from guide bars 42, 44 to permit the wing stub to pass through the station upon the next stepped operation of conveyor 20. As shown in FIGS. 11 and 12, a cam drive 150 is provided to shift or move wing positioner 94. Cam drive 150 includes a cam follower 152 pivoted at 153 and having a rod 156 joined at an upper end to base 136. The opposite end of rod 156 adjustably supports a follower plate 158. A cam sprocket 160 is rotatably supported on frame 14. Sprocket 160 includes a plurality of teeth 162 which engage the roller chain of conveyor 20. As a result, movement of conveyor 20 rotates sprocket 160.

Nonrotatably secured to sprocket 160 is a cam 164. Cam 164 is joined to sprocket 160 by a hub 166. Cam 164 defines a camming surface 168 which is engaged by cam follower plate 158. As seen in FIG. 4, when follower 158 is on the high point of surface 168, positioner 94 is in the operative position at guides 42, 44. As the sprocket rotates, follower 158 rides down onto the low spot of cam surface 168. As shown in FIG. 3, the wing positioner 94 pivots about aperture 144 to a lowered or "inoperative" position. When in the position shown in FIG. 3, plates 132, 134 and angled tab 140 are moved below the lower guide rod 144. The wing stub of the carcass may then pass freely by the second cut-off station.

Figures 11A, 12A:
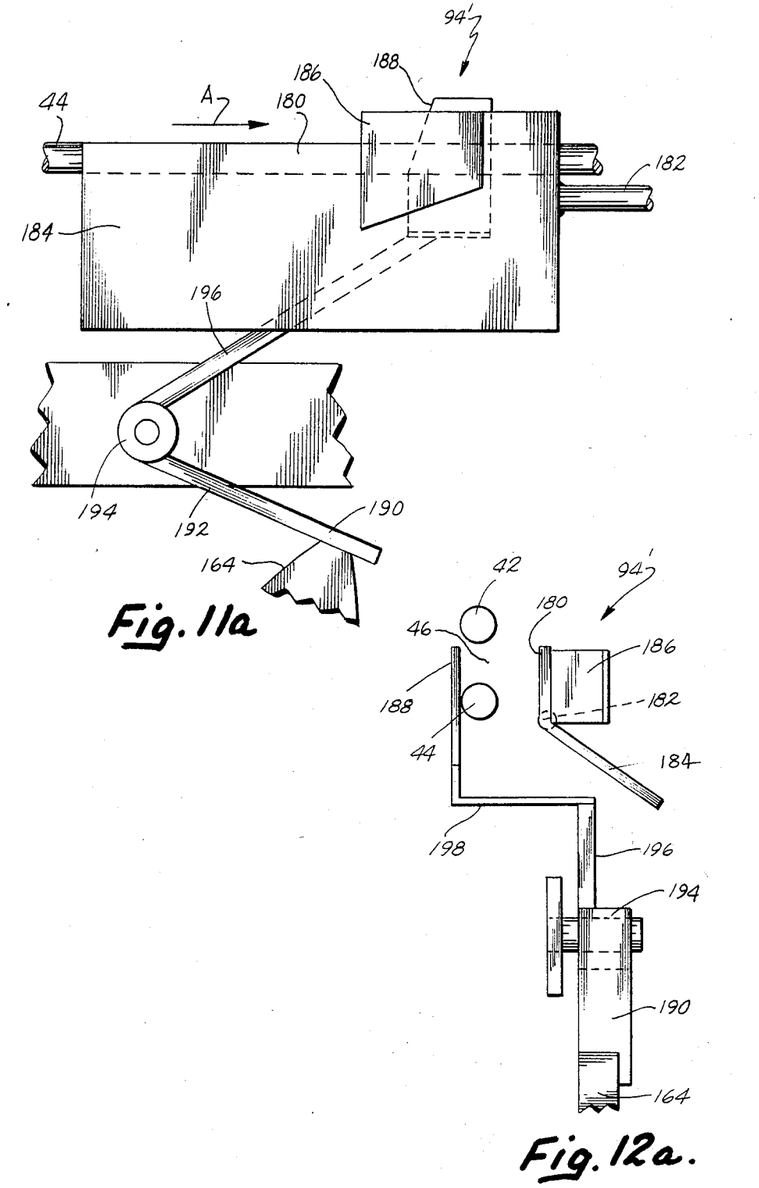

Another embodiment generally designated 94' of the wing positioner is illustrated in FIGS. 11a and 12a. Embodiment 94' is the presently preferred embodiment. In embodiment 94', a vertical sidewall or stop plate 180 is positioned in opposed, spaced relationship to guide rods 42, 44. Plate 180 is supported in a fixed position by a rod 182 which is joined to the frame 14. Extending outwardly and downwardly from plate 180 is a wing plate 184. Wing plate 184 corresponds to wing plate 138 of the embodiment of FIG. 11. Extending in a vertical plane and opening at an acute angle towards the feed end of the conveyor is a tab 186. Plate 180 corresponds to sidewall 134 of the embodiment of FIG. 9. An inner stop or side plate 188 is positioned alongside of guide rods 42, 44. Plate 188 corresponds to the sidewall 132 and tab 146 of the embodiment of FIG. 9. Plate 188 is moved from an inoperative to an operative position by cam 164. A cam follower 190 engages cam 164. Cam follower 190 is joined at an end 192 to a rotatably mounted hub 194. Extending from hub 194 is an arm 196. Arm 196 is joined at its opposite end to a base plate 198. Plate 198 carries the plate 188.

As seen from a comparison of FIGS. 12 and 12a, embodiment 94' functions similar to embodiment 94. When plate 188 is in the raised or operative position, plates 180, 188 define the channel-shaped slot and stop tabs aganist which the wing portion abuts. Embodiment 94' positions the wing to be engaged by the wing tucker or holding arm 92. After the knife blade passes through the space between plates 180, 188 severing the wing, the conveyor is actuated causing rotation of cam 164. As cam 164 rotates, cam follower 190 pivots downwardly, thereby lowering plate 188 below lower guide rod 44. With plate 188 in its inoperative position, the wing stub remaining attached to the carcass may pass freely along slot 46 defined by rods 42, 44.

CUTTING STATION DRIVE MEANS

Figure 13:
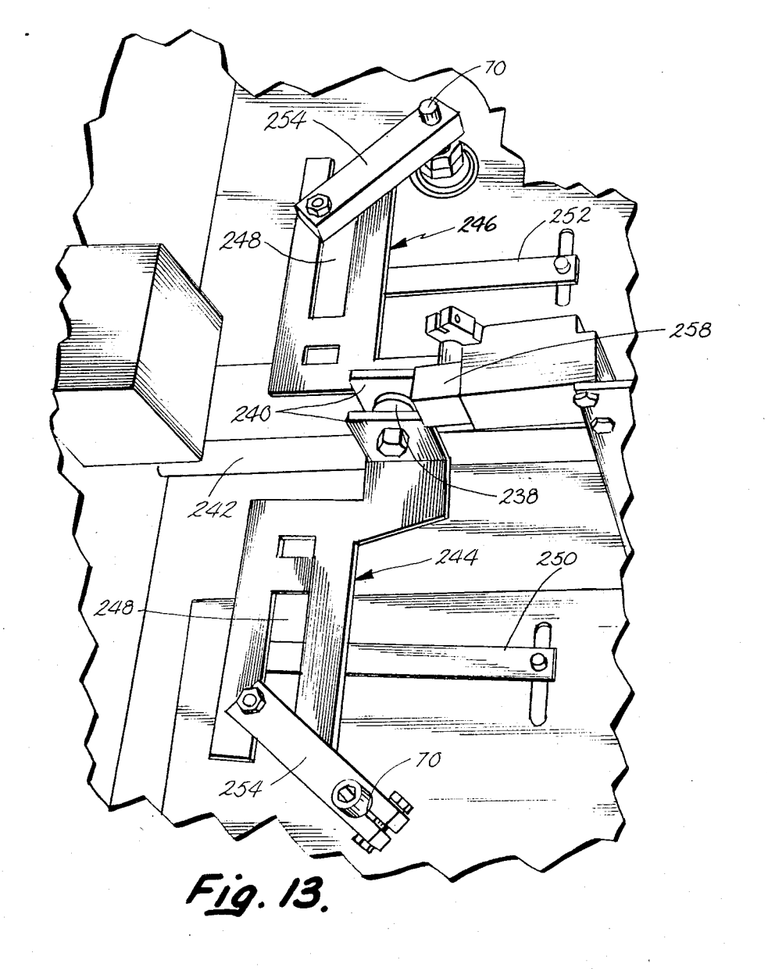
FIG. 13 is a fragmentary, perspective view showing the cutting station drive means incorporated in the present invention.
Figure 14:
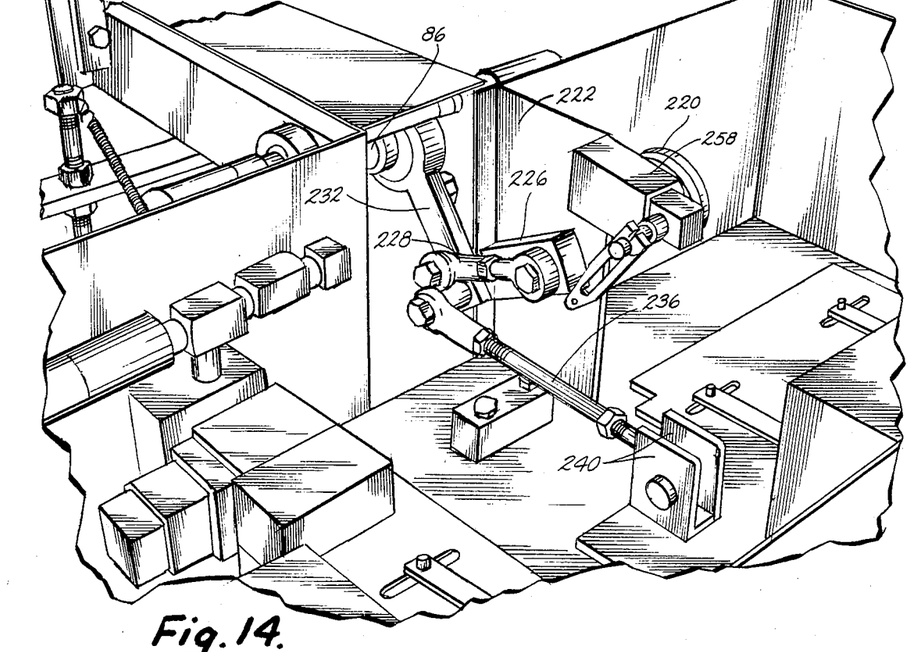
FIG. 14 is a fragmentary, perspective view showing a portion of the drive means of FIG. 13.
Figure 15:
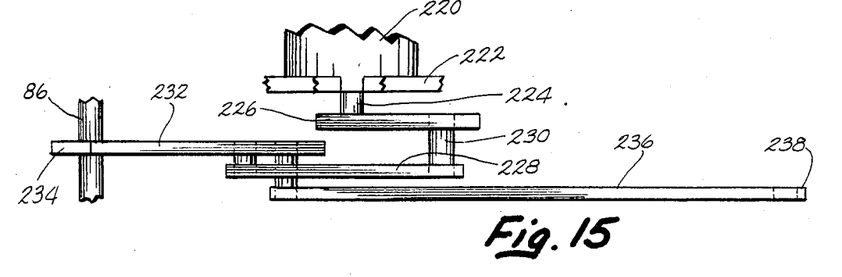
FIG. 15 is a schematic, top plan view of the drive motor and linkage.
Figure 16:
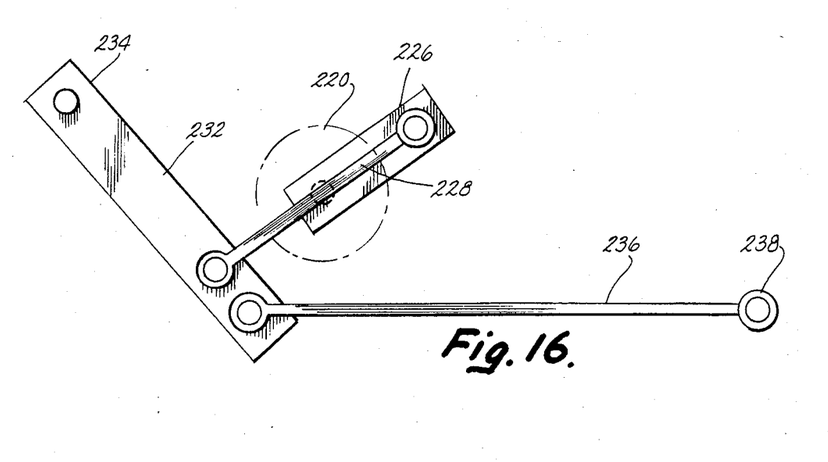
FIG. 16 is a schematic, side elevational view of the drive motor and linkage.

A drive means operatively connected to each of the swinging blades 94 of the second station and blades 72 of the first station is illustrated in FIGS. 13, 14, 15 and 16. Supported within housing 56 is a drive motor 220. Drive motor 220 is mounted on a support plate 222. Motor 220 may be a conventional hydraulic motor. Secured to output shaft 224 of motor 220 is an eccentric 226. Pivoted to eccentric 226 adjacent its outermost end is a drive link 228. Link 228 is secured to eccentric 226 by a pin 230. The opposite end of link 228 is pivoted to a second station drive link 232. Second station drive link 232 is nonrotatably fixed at an end 234 to blade shaft 86. Shaft 86 extends transversely of frame 14 and carries the knife support arms 84 at each end thereof. Also pivoted to drive link 232 is an enlongated first station link 236. As seen in FIG. 13, end 238 of link 236 is joined to a slide block or bracket 240. As should be apparent, rotation of shaft 224 will cause rotation of blade shaft 86 and linear movement of link 236. Link 236 will cause slide block or bracket 240 to shift longitudinally of apparatus 10. Block 240 rests on a guide 242. A pair of slotted, slide plates 244, 246 are joined to block 240. Plates 244, 246 each define a slot 248. Plates 244, 246 rest on and are guided by guides 250, 252, respectively. Vertical shafts 70 of the right and left first cutting assemblies of the first station extend up through the bottom of housing 56. Each shaft has a link or crank arm 254 nonrotatably secured thereto. The free ends of each link 254 ride within a slot 248 of a respective plate 244, 246.

As should be apparent from FIG. 13, reciprocating, linear movement along the longitudinal axis of apparatus 10 by plates 244, 246 rotates links or crank arms 254 through an angle of approximately 90°. This results in rotation of knife shafts 70.

Rotation of link 232 causes rotation of blade shaft 86. The drive means illustrated in FIGS. 13-16 simultaneously operates the swinging blades of the second station and the horizontally mounted, rotating blades of the first cutting station. Rotation of output shaft 224 causes the knife blades to rotate or oscillate from an initial start position through a cut position and back to the initial start or reset position. Suitable controls, such as valve 258 shown in FIG. 14, control the stepped rotation of output shaft 224.

OPERATION

In view of the foregoing description, the sequence of operation of wing cutter 10 should now be readily apparent to one of ordinary skill in the poultry cut-up art. An operator manually loads a poultry carcass on a support 30 at infeed end 20 of the conveyor. After loading the carcass, the operator depresses conventional palm switches to activate conveyor 20. As the conveyor 20 is activated, the bird is moved into position at the front cut-off knife assembly 50. Drive motor 220 is actuated which causes rotation of the vertical drive shaft 70. Knife blades 72 and arms 76 are then moved towards slot 68 defined by guards 62 of each wing tip cutter. The wing tip is forced against slot 68 by bars 76 and blade 72 severs the tip of the wing. Upon the next sequencing of the conveyor 20, the poultry carcass is transferred to the second cut-off knife assembly. During such sequencing, wing positioner 94 and 94' is raised to an operative position and the wing engages the upstanding tabs of the plates and the angled wing tab. Motor 220 is then actuated to rotate blade shaft 86. Blade support arms 84 then swing downwardly until the wing tucker or holding arms 92 engage the wing and hold it against the wing positioning subassembly. Blades 90 then pass through the positioned wing and knuckle severing the intermediate portion of the wing from the wing stub. When the conveyor is next sequenced, the movable portion of the wing positioner is pivoted away from the guide rails and the poultry carcass moves into the breast processor 40. The knives and wing positioner are reset to their operative positions ready to sever the wing portions of the next poultry carcass entering the machine.

Apparatus 10, therefore, automatically and sequentially severs selected portions of the wings of a poultry carcass prior to further processing of the carcass of subsequent cut-up machines. The second station cut-up assembly accurately positions the knuckle of the intermediate wing where it joins the wing stub and opens the wing for accurate cutting or severing by the swinging blades.

In view of the foregoing description, those of ordinary skill in the poultry processing art will undoubtedly envision various modifications which would not depart from the inventive concepts disclosed. It is expressly intended, therefore, that the above description should be considered as only that of the preferred embodiment. The true spirit and scope of the present invention may be determined by reference to the appended claims.

The embodiments of the invention in which an exclusive property or privilege is claimed are defined as follows:

1. A cut-off apparatus for severing a wing portion from a poultry carcass, said apparatus comprising: a frame; a poultry carcass support on said frame for supporting a carcass in a generally horizontal plane; a wing positioning means on said frame and adjacent said support for locking the wing in position to be severed, said wing positioning means including a wing stop; a wing holding means supported on said frame above said wing positioning means for engaging the wing portion and holding the wing portion against said positioning means; a knife on said frame for severing the wing portion from the carcass; a knife drive means connected to said knife for moving said knife to sever the wing portion after said wing holding means is engaging said wing portion and; wing positioning drive means operatively engaging said wing positioning means for moving said wing positioning means between an operative position and an inoperative position.

2. A cut-off apparatus as defined in claim 1 wherein said support comprises:
    an elongated conveyor having a plurality of tandemly arranged, spaced carcass support members; and
    a pair of vertically spaced, elongated guide rails supported above said conveyor for engaging the wing portion therebetween so that the wing portion extends out from the carcass.

3. A cut-off apparatus as defined in claim 2 wherein said wing positioning drive means comprises:
    a cam engaged by said conveyor to rotate as said conveyor moves; and
    a cam follower joined to said wing positioning means and engaging said cam so that as said cam rotates, said wing positioning means moves between said positions.

4. A cut-off apparatus for severing a wing portion from a poultry carcass, said apparatus comprising:
    a frame;
    a poultry carcass support on said frame for supporting a carcass in a generally horizontal plane;
    a wing positioning means on said frame and adjacent said support for locking the wing portion in position to be severed;
    a wing holding means supported on said frame above said wing positioning means for engaging the wing portion and holding the wing portion against said positioning means;
    a knife on said frame for severing the wing portion from the carcass; and
    knive drive means connected to said knife for moving said knife to sever the wing portion after said wing holding means is engaging said wing portion and wherein said wing positioning means comprises:
    an enlongated, generally channel-shaped member having a base and opposed sidewalls;
    pivot means pivotally mounting said channel-shaped member adjacent said support;
    a tab joined to one of said sidewalls and extending outwardly therefrom at an acute angle towards a feed end of said conveyor; and
    a wing plate joined to said one of said sidewalls and extending outwardly and downwardly with respect to said sidewall.

5. A cut-off apparatus as defined in claim 4 further including wing positioning drive means operatively engaging said wing positioning means for moving said wing positioning means between an operative position and an inoperative position.

6. A cut-off apparatus as defined by claim 5 wherein said wing positioning drive means comprises:
 a cam;
 cam drive means operatively connected to said cam for rotating said cam; and
 a cam follower joined to said wing positioning means and engaging said cam so that as said cam rotates, said wing positioning means moves between said positions.

7. A cut-off apparatus for severing a wing portion from a poultry carcass, said apparatus comprising:
 a frame;
 a poultry carcass support on said frame for supporting a carcass in a generally horizontal plane;
 a wing positioning means on said frame and adjacent said support for locking the wing portion in position to be severed;
 a wing holding means supported on said frame above said wing positioning means for engaging the wing portion and holding the wing portion against said positioning means;
 a knife on said frame for severing the wing portion from the carcass; and
 knife drive means connected to said knife for moving said knife to sever the wing portion after said wing holding means is engaging said wing portion and wherein said wing positioning means comprises:
 an elongated wing plate having a tab joined to said plate and extending outwardly therefrom at an acute angle towards a feed end of said conveyor;
 a stop plate in spaced parallel relationship to said wing plate; and
 stop plate positioning means connected to said stop plate for moving said plate between an inoperative position away from said wing plate and an operative position in opposed relationship to said wing plate.

8. An cut-off apparatus as defined in claim 7 wherein said stop plate positioning means comprises:
 a cam;
 cam drive means operatively connected to said cam for rotating said cam; and
 a cam follower joined to said stop plate and engaging said cam.

9. A cut-off apparatus for severing a wing portion from a poultry carcass, said apparatus comprising:
 a frame;
 a poultry carcass support on said frame for supporting a carcass in a generally horizontal plane;
 a wing positioning means on said frame and adjacent said support for locking the wing portion in position to be severed;
 a wing holding means supported on said frame above said wing positioning means for engaging the wing portion and holding the wing portion against said positioning means;
 a knife on said frame for severing the wing portion from the carcass; and
 knife drive means connected to said knife for moving said knife to sever the wing portion after said wing holding means is engaging said wing portion, said support comprising:
 an elongated conveyor having a plurality of tandemly arranged, spaced carcass support members; and
 a pair of vertically spaced, elongated guide rails supported above said conveyor for engaging the wing portion therebetween so that the wing portion extends out from the carcass, and wherein said wing positioning means comprises:
 an enlongated wing plate having a tab joined to said plate and extending outwardly therefrom at an acute angle towards a feed end of said conveyor;
 a stop plate in spaced parallel relationship to said wing plate; and
 stop plate positioning means connected to said stop plate for moving said plate between an inoperative position away from said wing plate and an operative position in opposed relationship to said wing plate.

10. A cut-off apparatus as defined by claim 9 wherein said stop plate positioning means comprises:
 a cam;
 cam drive means operatively connected to said cam for rotating said cam; and
 a cam follower joined to said stop plate and engaging said cam.

11. A cut-off apparatus as defined in claim 1 wherein said knife includes:
 a knife support pivoted at an upper end for rotational movement in a plane perpendicular to said horizontal plane; and
 a knife blade supported on said knife support at a lower end thereof and extending generally perpendicular to said knife support, said knife drive means rotating said support from a first position to a second position so that said blade will cut off said wing portion.

12. A cut-off apparatus as defined in claim 11 wherein said wing holding means comprises:
 an elongated, bifurcated arm defining a slot through which said blade extends, said arm being pivoted to said knife support; and
 biasing means engaging said arm for biasing said arm towards said support.

13. A cut-off apparatus as defined by claim 12 wherein said support comprises:
 an elongated conveyor having a plurality of tandemly arranged, spaced carcass support members; and
 a pair of vertically spaced, elongated guide rails supported above said conveyor for engaging the wing portion therebetween so that the wing portion extends out from the carcass.

14. A cut-off apparatus as defined in claim 13 further including wing positioning drive means operatively engaging said wing positioning means for moving said wing positioning means between an operative position and an inoperative position.

15. A cut-off apparatus as defined in claim 14 wherein said wing positioning drive means comprises:
 a cam engaged by said conveyor to rotate as said conveyor moves; and
 a cam follower joined to said wing positioning means and engaging said cam so that as said cam rotates, said wing positioning means moves between said positions.

16. A cut-off apparatus for severing a wing portion from a poultry carcass, said apparatus comprising:
 a frame;
 a poultry carcass support on said frame for supporting a carcass in a generally horizontal plane;

a wing positioning means on said frame and adjacent said support for locking the wing portion in position to be severed;

a wing holding means supported on said frame above said wing positioning means for engaging the wing portion and holding the wing portion against said positioning means;

a knife on said frame for severing the wing portion from the carcass; and knife drive means connected to said knife for moving said knife to sever the wing portion after which wing holding means is engaging said wing portion, said knife including:

a knife support pivoted at an upper end for rotational movement in a plane perpendicular to said horizontal plane; and a knife blade supported on said knife support at a lower end thereof and extending generally perpendicular to said knife support, said knife drive means rotating said support from a first position to a second position so that said blade will cut off said wing portion, said wing holding means comprising:

an elongated, bifurcated arm defining a slot through which said blade extends, said arm being pivoted to said knife support; and biasing means engaging said arm for biasing said arm towards said support, said support comprising:

an elongated conveyor having a plurality of tandemly arranged, spaced carcass support members; and a pair of vertically spaced, elongated guide rails supported above said conveyor for engaging the wing portion therebetween so that the wing portion extends out from the carcass, and wherein said wing positioning means comprises:

an elongated wing plate having a tab joined to said plate and extending outwardly therefrom at an acute angle towards a feed end of said conveyor;

a stop plate in spaced parallel relationship to said wing plate; and stop plate positioning means connected to said stop plate for moving said plate between an inoperative position away from said wing plate and an operative position in opposed relationship to said wing plate.

17. A cut-off apparatus as defined in claim 16 wherein said stop plate positioning means comprises:

a cam;

cam drive means operatively connected to said cam for rotating said cam; and a cam follower joined to said stop plate and engaging said cam.

18. A cut-off apparatus for severing a wing portion from a poultry carcass, said apparatus comprising:

a frame;

a poultry carcass support on said frame for supporting a carcass in a generally horizontal plane;

a wing positioning means on said frame and adjacent said support for locking the wing portion in position to be severed;

a wing holding means supported on said frame above said wing positioning means for engaging the wing portion and holding the wing portion against said positioning means;

a knife on said frame for severing the wing portion from the carcass; and knife drive means connected to said knife for moving said knife to sever the wing portion after said wing holding means is engaging said wing portion, said knife including:

a knife support pivoted at an upper end for rotational movement in a plane perpendicular to said horizontal plane; and a knife blade supported on said knife support at a lower end thereof and extending generally perpendicular to said knife support, said knife drive means rotating said support from a first position to a second position so that said blade will cut off said wing portion, said wing holding means comprising:

an elongated, bifurcated arm defining a slot through which said blade extends, said arm being pivoted to said knife support; and biasing means engaging said arm for biasing said arm towards said support, said support comprising:

an elongated conveyor having a plurality of tandemly arranged, spaced carcass support members; and a pair of vertically spaced, elongated guide rails supported above said conveyor for engaging the wing portion therebetween so that the wing portion extends out from the carcass, said apparatus further including wing positioning drive means operatively engaging said wing positioning means for moving said wing positioning means between an operative position and an inoperative position, and wherein said wing positioning means comprises:

an elongated, generally channel-shaped member having a base and opposed sidewalls;

pivot means pivotally mounting said channel-shaped member adjacent said support;

a tab joined to one of said sidewalls and extending outwardly therefrom at an acute angle towards a feed end of said conveyor; and a wing plate joined to said one of said sidewalls and extending outwardly and downwardly with respect to said sidewall.

19. A cut-off apparatus as defined by claim 18 wherein said wing positioning drive means comprises:

a cam engaged by said conveyor to rotate as said conveyor moves; and a cam follower joined to said wing positioning means and engaging said cam so that as said cam rotates, said wing positioning means moves between said positions.

20. An apparatus for severing portions of the wing from a poultry carcass, said apparatus comprising:

a conveyor defining an upper run, said conveyor including a plurality of tandemly arranged, spaced carcass supports;

a guide means extending along said conveyor for engaging and guiding the wings of the carcass as it is moved along said conveyor upper run;

a first cutting means on said conveyor for severing the outermost portion of the wing;

a second cutting means on said conveyor spaced from said first cutting means for severing another portion of the wing, said second cutting means including a movable wing positioning and holding means supported at said guide means for positioning and holding said another wing portion, and a blade movable with respect to said wing positioning and holding means to sever the another wing portion; and drive means operatively connected to said first and second cutting means for actuating said cutting means; said second cutting means further including an elongated blade support arm coupled to said drive means for pivotal movement, said blade of said second cutting means being joined to said support arm, said wing positioning and holding means comprising:

a wing holding arm having an upper end pivoted to said blade support arm and a bifurcated lower end defining a slot for said blade; and biasing means between said wing holding arm and said support arm for biasing said wing holding arm towards said support arm and wherein said wing positioning and holding means further includes:

a wing lock member having an angled tab positioned to engage the another wing portion; and a stop plate positioned in spaced, parallel relationship to said wing lock member so that the wing portion engages said stop plate and said wing lock member.

21. An apparatus as defined by claim 20 wherein said wing positioning and holding means further includes stop plate positioning means moving said stop plate between an inoperative position and an operative position in opposed relationship to said wing lock member with said guide means extending therebetween.

22. An apparatus for severing portions of the wing from a poultry carcass, said apparatus comprising:

a conveyor defining an upper run, said conveyor including a plurality of tandemly arranged, spaced carcass supports;

a guide means extending along said conveyor for engaging and guiding the wings of the carcass as it is moved along said conveyor upper run;

a first cutting means on said conveyor for severing the outermost portion of the wing;

a second cutting means on said conveyor spaced from said first cutting means for severing another portion of the wing, said second cutting means including a movable wing positioning and holding means supported at said guide means for positioning and holding said another wing portion, and a blade movable with respect to said wing positioning and holding means to sever the another wing portion; and drive means operatively connected to said first and second cutting means for actuating said cutting means, said second cutting means further including an elongated blade support arm coupled to said drive means for pivotal movement, said blade of said second cutting means being joined to said support arm, said wing positioning and holding means comprising:

a wing holding arm having an upper end pivoted to said blade support arm and a bifurcated lower end defining a slot for said blade; and biasing means between said wing holding arm and said support arm for biasing said wing holding arm towards said support arm, and wherein said wing positioning and holding means further includes:

a channel portion having a base and spaced sides, said guide means extending through said channel when said lock member is in said second position, one of said sides being a stop; and a positioning tab extending outwardly from the other of said sides.

23. An apparatus as defined by claim 22 further including cam means connected to said channel portion for moving said channel portion between an inoperative position and an operative position.

24. An apparatus for severing portions of the wing from a poultry carcass, said apparatus comprising:

a conveyor defining an upper run, said conveyor including a plurality of tandemly arranged, spaced carcass supports;

a guide means extending along said conveyor for engaging and guiding the wings of the carcass as it is moved along said conveyor upper run;

a first cutting means on said conveyor for severing the outermost portion of the wing;

a second cutting means on said conveyor spaced from said first cutting means for severing another portion of the wing, said second cutting means including a movable wing positioning and holding means supported at said guide means for positioning and holding said another wing portion, and a blade movable with respect to said wing positioning and holding means to sever the another wing portion; and drive means operatively connected to said first and second cutting means for actuating said cutting means, said first cutting means comprising:

a guide extending outwardly from said guide means and defining a blade slot;

a knife shaft rotatably mounted at said guard and operatively connected to said drive means for rotation thereby;

a blade secured to said knife shaft for movement into and out of said blade slot; and an arm secured to said knife shaft for engaging the wing outermost portion and holding the wing against said guard, said second cutting means further including an elongated blade support arm coupled to said drive means for pivotal movement, said blade being joined to said support arm, said wing positioning and holding means comprising:

a wing holding arm having an upper end pivoted to said blade support arm and a bifurcated lower end defining a slot for said blade; and biasing means between said wing holding arm and said support arm for biasing said wing holding arm towards said support arm, and wherein said wing positioning and holding means further includes:

a wing lock member having an angled tab positioned to engage the another wing portion; and a stop plate positioned in spaced, parallel relationship to said wing lock member so that the wing portion engages said stop plate and said wing lock member.

25. An apparatus as defined by claim 24 wherein said wing positioning and holding means further includes stop plate positioning means moving said stop plate between an inoperative position and an operative position in opposed relationship to said wing lock member with said guide means extending therebetween.

* * * * *